(12) United States Patent
Cheng

(10) Patent No.: US 9,811,582 B2
(45) Date of Patent: Nov. 7, 2017

(54) METHOD AND SYSTEM FOR INFORMATION QUERY

(71) Applicant: TENCENT TECHNOLOGY (SHENZHEN) COMPANY LIMITED, Guangdong (CN)

(72) Inventor: Yu Cheng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 178 days.

(21) Appl. No.: 13/676,930

(22) Filed: Nov. 14, 2012

(65) Prior Publication Data
US 2013/0073588 A1 Mar. 21, 2013

Related U.S. Application Data

(63) Continuation of application No. PCT/CN2011/077659, filed on Jul. 27, 2011.

(30) Foreign Application Priority Data

Aug. 5, 2010 (CN) .......................... 2010 1 0251880

(51) Int. Cl.
G06F 17/30 (2006.01)

(52) U.S. Cl.
CPC .. *G06F 17/30634* (2013.01); *G06F 17/30699* (2013.01)

(58) Field of Classification Search
CPC ......... G06F 17/30867; G06F 17/30634; G06F 17/30699
See application file for complete search history.

(56) References Cited

U.S. PATENT DOCUMENTS

| | | | |
|---|---|---|---|
| 2004/0225643 A1* | 11/2004 | Alpha et al. | 707/3 |
| 2006/0117378 A1* | 6/2006 | Tam | G06F 21/10 726/3 |
| 2007/0112758 A1* | 5/2007 | Livaditis | 707/5 |
| 2008/0102856 A1* | 5/2008 | Fortescue et al. | 455/456.1 |
| 2008/0147722 A1* | 6/2008 | Dolin | G06F 17/30867 |
| 2009/0249451 A1 | 10/2009 | Su et al. | |

(Continued)

FOREIGN PATENT DOCUMENTS

| CN | 101009573 A | 8/2007 |
|---|---|---|
| CN | 101196915 A | 6/2008 |

(Continued)

OTHER PUBLICATIONS

International Search Report dated Sep. 29, 2011; PCT/CN2011/077659.

(Continued)

*Primary Examiner* — Huawen A Peng
(74) *Attorney, Agent, or Firm* — Brinks Gilson & Lione

(57) ABSTRACT

A method and system for information query include: receiving and saving shared information released by users (101); receiving a query request sent by a user and searching for a trusted user corresponding to the user (102); searching for shared information meeting a query condition in the query request among shared information released by the trusted user, and returning a query result to the user requesting for query (103). The method and system may provide a more credible query result to the querying user.

9 Claims, 3 Drawing Sheets

(56) References Cited

U.S. PATENT DOCUMENTS

2009/0287774 A1 11/2009 Punera et al.
2011/0264648 A1* 10/2011 Gulik ................ G06F 17/30867
707/722

FOREIGN PATENT DOCUMENTS

CN 101252731 A 8/2008
JP 2005293276 A 10/2005
TW 200949566 A 12/2009

OTHER PUBLICATIONS

Taiwanese Office Action for Taiwan Application No. 100133241 dated May 25, 2015, and the English language concise explanation therefor.

* cited by examiner

METHOD AND SYSTEM FOR INFORMATION QUERY

FIELD OF THE INVENTION

The present invention relates to information processing technique, and particularly to a method and system for information query.

BACKGROUND OF THE INVENTION

With growing popularity of network technology and constant development of network service, the network has become an indispensable part of people's lives. With services provided by network service providers, a user may share various types of information cross-regionally via the network. For example, through a platform provided by the network service providers, the user may share his/her information on this platform or query information shared by other users. The user may release information like "dumplings here are really tasty" or "accommodation here is really nice" on this platform.

As more and more users are being involved in network life, as well as more and more users would like to release their shared information for other users to query and refer, the quantity of shared information manifests an explosive growth, and an information query system may provide more and richer information to users. Although the information query system may provide more shared information to the users, with the ever increasing amount of the shared information and ever increasing amount of the users, there is a lot of false information among the large amount of shared information. When receiving a query request from a user, a current information query system simply searches among all of the released shared information, without judging whether the shared information is true or false, so that there inevitably exists false information in the information returned to the user, so the false information is provided to the user.

Therefore, it is a technical problem to be solved urgently in the prior art that how the information query system processes information and provides a relatively credible query result to a querying user.

SUMMARY OF THE INVENTION

The present invention provides a method and system for information query to process shared information released by users, and to provide a relatively credible query result to querying users.

Technical scheme of the present invention is realized as follows.

A method for information query includes:
receiving and saving pieces of shared information released by users;
receiving a query request sent by a user, and searching for at least one trusted user corresponding to the user; wherein the user sending the query request is the one having released a piece of shared information or the one having not released any shared information; and
searching for at least one piece of shared information meeting a query condition in the query request among at least one piece of shared information released by the at least one trusted user, and returning a first query result comprising the at least one piece of shared information searched out to the user sending the query request.

A system for information query includes a processing server and a querying server; wherein
the processing server, to receive and save shared information released by users;
the querying server, to receive a query request sent by a user; search for at least one trusted user corresponding to the user, wherein the user sending the query request is the one having released a piece of shared information or the one having not released any shared information; search for at least one piece of shared information meeting a query condition in the query request among at least one piece of shared information released by the at least one trusted user, and return a first query result comprising the at least one piece of shared information searched out to the user sending the query request.

In the method and system for information query provided by the present invention, shared information released by a user is received and saved; when a query request sent by the user is received, trusted users corresponding to this user are searched out firstly; and then the shared information meeting the query condition is searched for among the shared information released by the trusted users according to the query condition in the query request, and a query result is returned to the user requesting for query. A queried object is processed during a querying process in the technical scheme of the present invention, so that a relatively credible query result may be provided to the querying user through this technical scheme.

DETAILED DESCRIPTION OF THE INVENTION

In this part of detailed description, preferable examples of the present invention are shown and described through optimal examples expected by inventors implementing the present invention. It should be realized that, various obvious aspects may be modified without departing from the present invention. Accordingly, the drawings and description should be regarded as schematic in essence, rather than restrictive.

Figure 1:
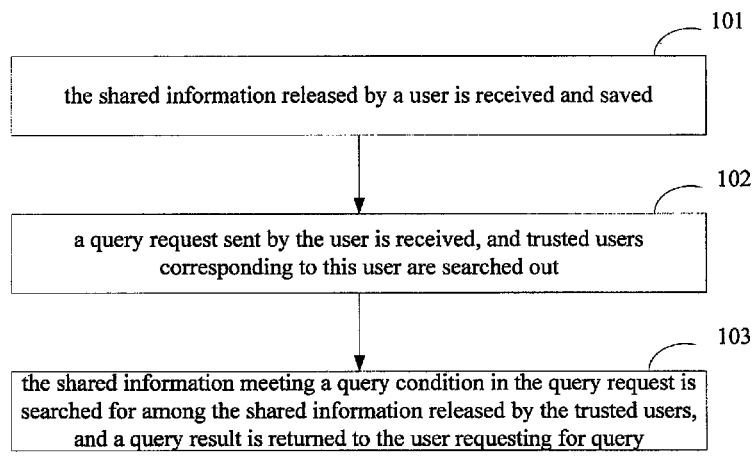
FIG. 1 is a schematic flowchart illustrating a method of an example of the present invention.

In order to provide a relatively credible query result to a querying user, a query operation may merely be performed to the shared information released by trusted users. With reference to FIG. 1 specifically, FIG. 1 is a schematic flowchart of the method of the present invention.

In step 101, the shared information released by a user is received and saved; as various communication ways, the user indicated in the example of the present invention may be either a user accessing the network through a computer terminal, or a user accessing the network through a mobile terminal.

In step 102, a query request sent by the user is received, and trusted users corresponding to this user are searched out.

The trusted users in the example of the present invention may be a kind of users whom a querying user can trust. The trusted user may be defined in many ways. For example, users determined based on a Social Networking Services (SNS) good friends chain, or users belonging to the same group, etc. Since the users belong to the same group, information released by each other is relatively credible.

In step 103, the shared information meeting a query condition in the query request is searched for among the shared information released by the trusted users, and a query result is returned to the user requesting for query.

Considering that the trusted users are part of users of a sharing platform after all, it may happen that the shared information meeting the query condition is not searched out, or the shared information searched out is too little, thus when the number of shared information meeting the query condition is less than a predetermined number, the shared information meeting the query condition may be searched for among shared information released by non-trusted users according to the query condition in the query request, and then a query result together with the query result for the trusted users are returned to the user requesting for query for reference. Under this circumstance, when the query results are returned to the user, the shared information searched out may be marked to identify whether the shared information is from the trusted users or from the non-trusted users, which is referred by the users. Here, the predetermined number may be set according to the practical system, such as being set as 3 pieces.

In order to make the user search out the requested information more accurately, there is a further processing in the technical scheme of the present invention. Namely, when the shared information released by a user is saved in the above step 101, position information corresponding to this shared information is further obtained and saved (this position information is information of the position in which the user released the shared information); then, the shared information in the query result returned in step 103 also further carries the position information corresponding to the shared information. According to the position information, the querying user may further recognize a position of the released shared information, which is helpful for the user to recognize the shared information more comprehensively. For example, when the querying user searches out a piece of shared information about "food", namely "dumplings here are really tasty". When this shared information is displayed, if the position information is carried together, the querying user may exactly know the position in which the tasty dumplings are located.

As an extension of the example of the present invention, the position information corresponding to the shared information may be obtained by the system dynamically rather than be obtained and saved when the shared information released by the user is saved, and be automatically attached to the shared information, so that the efficiency of releasing shared information by a user is increased.

In the technical scheme of the present invention, when a terminal in which a user is located receives a query result returned to the user, the terminal calls a map in the terminal, and displays corresponding shared information on the map according to position information corresponding to the shared information in the query result. Furthermore, when the user selects a piece of shared information, position information indicating where the user is located presently is obtained, and a route on the map along which the user is to reach the position corresponding to the selected shared information according to the position information corresponding to the selected shared information is provided.

When a user accesses the network via a mobile terminal, the position information of this mobile terminal may be obtained through a built-in GPS function in the mobile terminal; when the user accesses the network via a computer terminal, the position information of the user may be determined through an IP address of this computer terminal. Different accessing ways lead to different precisions of the position information. Some position information may be very precise, such as longitude/latitude information obtained through a GPS; while some position information may be a scope only. When the obtained position information is just a scope, this position information may be further determined as a position within this scope according to a preset rule.

The query condition may be at least one of a type of the shared information, the position information and an identifier of a trusted user. Specific query ways may use existing related methods, which do not be repeated here.

Preferably, when the position information is included in the query condition, the shared information meeting the query condition including the position information is the shared information within a predetermined scope centered at this position information. For example, when the predetermined scope is 100 meters, the shared information meeting the query condition including the position information is the shared information within the scope of 100 meters centered at this queried position information.

After the user receives the returned query result, when it is determined that the shared information in the query result is accurate, it may indicate an information query system that the corresponding shared information is accurate; when the query result is returned to the user requesting for query, the accurate shared information in the query result is further marked. Meanwhile, the shared information with an accuracy identifier may be displayed to the user with priority. Thus, the user requesting for query may judge whether the shared information is accurate according to whether the shared information has an accuracy identifier, which is helpful for the user to obtain information more accurately, and so that a relatively credible query result is provided to the user.

The shared information carrying the position information may also be used for displaying other than for being queried, namely the position information corresponding to the shared information is displayed when the shared information is displayed on the sharing platform. At this time, the shared information may be aggregated according to the type of the shared information, and be sorted, saved and displayed according to the corresponding position information. There are various types of the shared information, which may be grouped according to purposes of the shared information. Here, the shared information may be grouped into four types, which are clothing, food, housing and transportation. When being saved and displayed, the shared information may be respectively saved and displayed according to these four types; and when being saved and displayed, the shared information may be sorted according to the position information corresponding to each piece of shared information, so that it is convenient to query and view. In addition, when the shared in formation is displayed, it is preferable to display simultaneously whether this shared information carries an accuracy identifier.

Accordingly, the present invention may set up a concerned relationship management server. This server stores information which the users are concerned about, such as a piece of position information, or a type, or a user, or any combination of these three groups. When a user releases the shared information, the shared information may be matched with contents in the concerned relationship management server, if it is matched, then the shared information released currently is pushed to the user for viewing in time.

All or part of the procedures of the above method examples may be implemented through hardware following instructions of a computer program; the aforementioned computer program may be stored in a computer-readable storage medium; when running, the computer program may perform the procedures of the above method examples; and the aforementioned storage medium includes mediums which may store program code, such as ROM (Read-Only Memory), RAM (Random Access Memory), diskette and CD.

Figure 2:
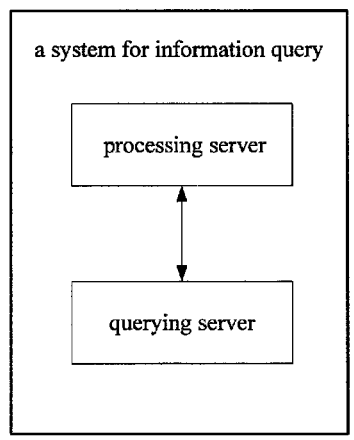
FIG. 2 is a diagram illustrating a basic structure of a system of an example of the present invention.

In addition, an example of the present invention also provides a system for information query, which is shown in FIG. 2.

The system includes a processing server and a querying server; the processing server is adapted to receive and save shared information released by a user; the querying server is adapted to receive a query request sent by a user, search for trusted users corresponding to the user; search for shared information meeting a query condition among the shared information released by the trusted users according to the query condition in the query request as well as the shared information saved in the processing server, and return a query result to a user requesting for query.

Here, trust relationships among users may be stored in the querying server itself, or be stored in a trust relationship server of an external third party. When the trust relationships are stored in the trust relationship server, the querying server may access the trust relationship server to search for trusted users corresponding to the current user.

Specifically, the querying server is adapted to judge whether the number of the shared information searched out meeting the query condition is less than a predetermined number; if it is judged that the number of the shared information searched out is not less than the predetermined number, then the querying server is adapted to return the query result to the user requesting for query; if it is judged that the number of the shared information searched out is less than the predetermined number, then the querying server is adapted to return the query result together with the query result for the trusted users to the user requesting for query.

In addition, when a user releases the shared information, the terminal device in which the user is located obtains current position information of this user, and sends the position information together with the shared information to the processing server; the processing server is adapted to further save this position information corresponding to the shared information when saving the shared information released by the user; accordingly, the querying server is further adapted to carry the position information corresponding to the shared information in the query result when returning the query result.

After receiving the query result returned to the user, the terminal device in which the user is located calls a map in the terminal device, and displays corresponding shared information on the map according to the position information corresponding to shared information in the query result. So, when the user selects a piece of shared information, the terminal device obtains position information indicating where the user is located presently, and provides a route on the map along which the user is to reach the position corresponding to the selected shared information according to the position information corresponding to the selected shared information.

The query condition used by the querying server for searching for the shared information may be at least one of a type of the shared information, the position information and an identifier of a trusted user. When the position information is included in the query condition, the shared information meeting the query condition including the position information searched out by the querying server is the shared information within a predetermined scope centered at this position information.

In addition, after receiving the returned query result, when determining that the shared information in the query result is accurate according to an instruction of the user, the terminal device indicates an information query system that the corresponding shared information is accurate; the processing server marks the corresponding shared information according to the indication; the querying server further returns an identifier corresponding to the shared information in the returned query result.

Figure 3:
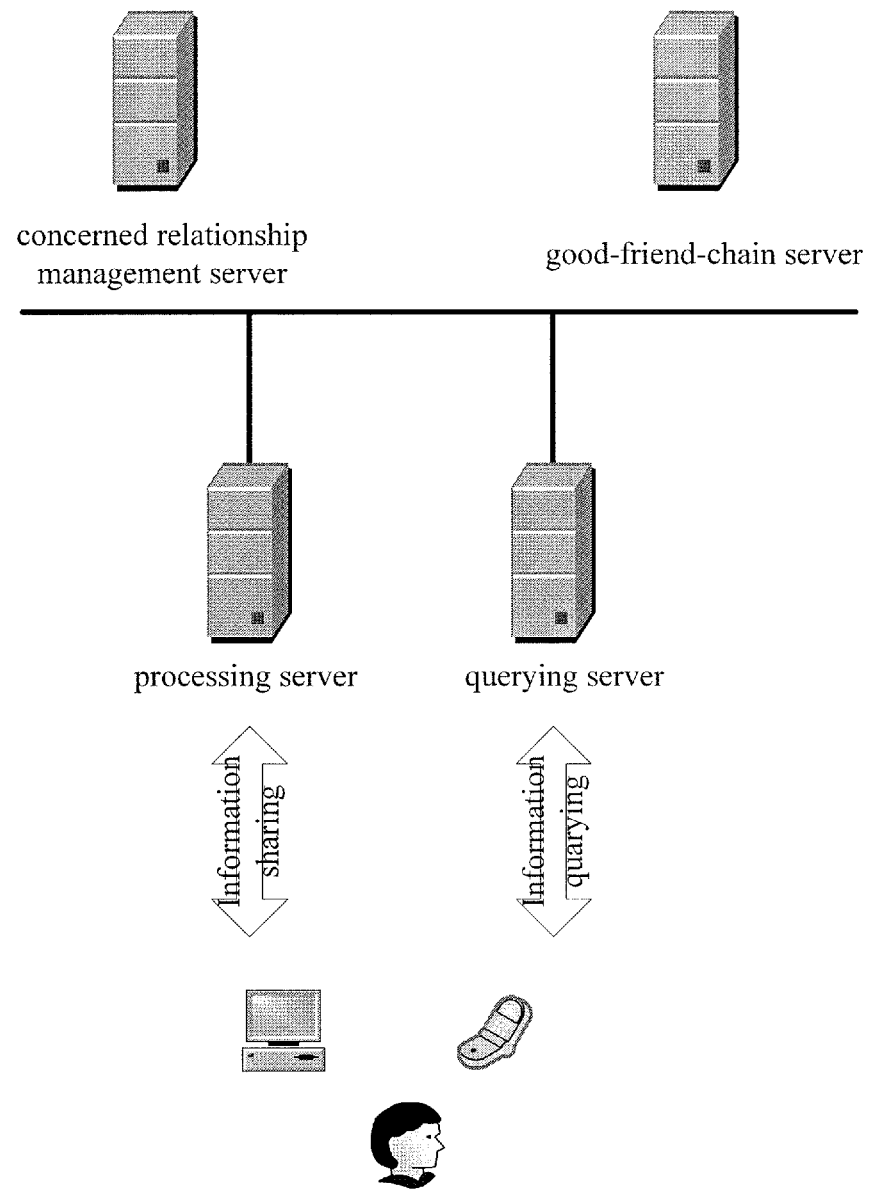
FIG. 3 is a diagram illustrating a schematic structure of a system of an example of the present invention.

The present system may further include a concerned relationship management server and a good-friend-chain server, as shown in FIG. 3. The concerned relationship management server stores information about which users are concerned, such as a piece of position information, or a type, or a user, or any combination of these three groups. When a user releases the shared information, the shared information may be matched with contents in the concerned relationship management server and in the good-friend-chain server, if it is matched, then the shared information released currently is pushed to the user for viewing in time.

The technical scheme of the present invention is hereinafter described in detail with reference to accompanying examples.

Figure 4:
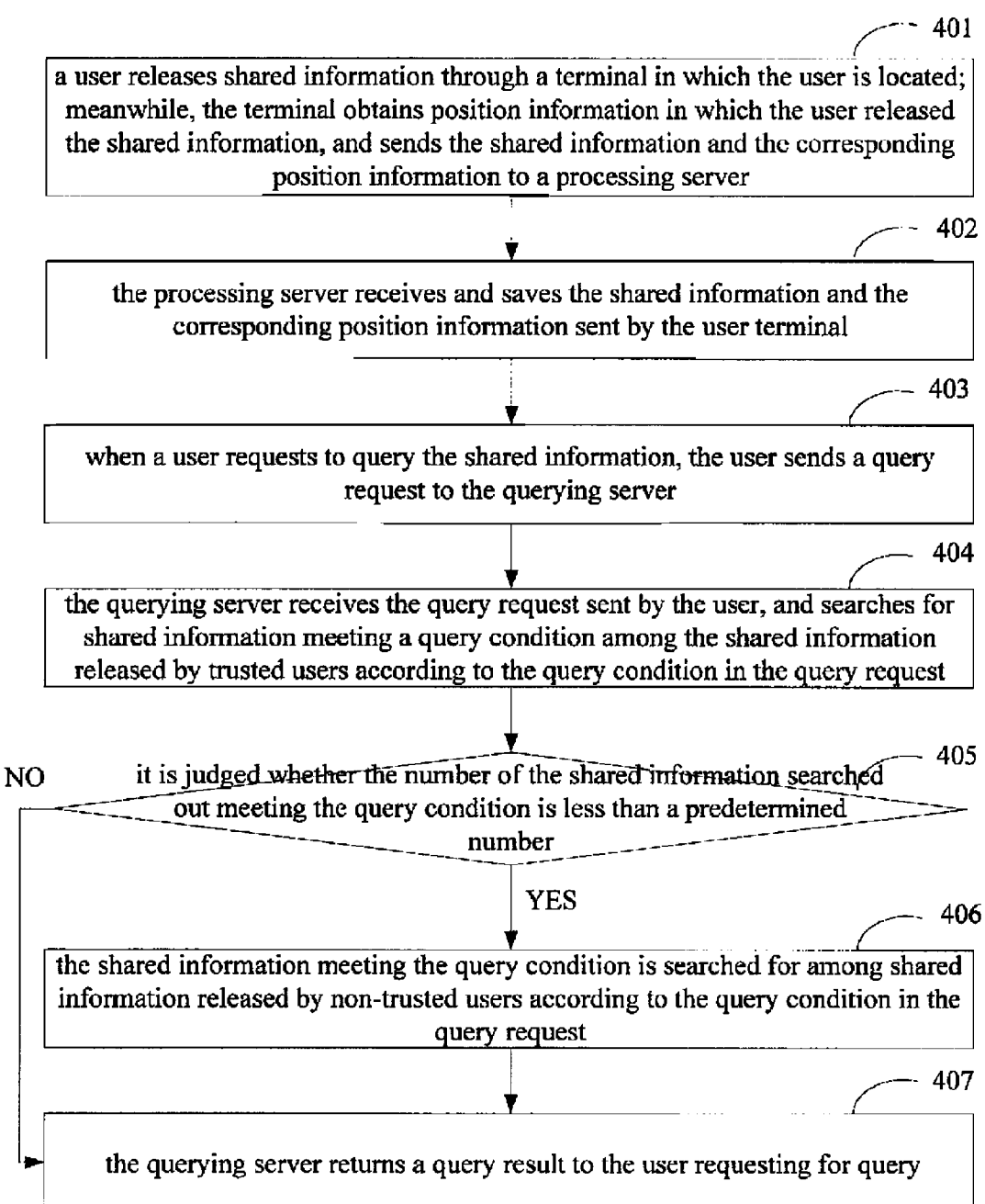
FIG. 4 is a flowchart illustrating a method of an example of the present invention.

As shown in FIG. 4, FIG. 4 is a specific flowchart illustrating an example of the present invention.

In step 401, a user releases shared information through a terminal in which the user is located; meanwhile, the terminal obtains position information in which the user released the shared information, and sends the shared information and the corresponding position information to a processing server.

In step 402, the processing server receives and saves the shared information and the corresponding position information sent by the user terminal. For example, for user A, the processing server may save information about places about which the user A are concerned, wherein the latitude/longitude of the places is (L,w), (j,k), (l,m).

When saving data, the processing server may aggregate information according to the type of the shared information, and save the information in sequence according to the corresponding position information. There are various types of the shared information, which may be grouped according to purposes of the shared information in the present example. Here, the shared information may be grouped into four types, which are clothing, food, housing and transportation. Meanwhile, when saving the shared information, the processing server may also record the user corresponding to the shared information for querying use.

When receiving the shared information released by the user, the processing server may display the shared information on the sharing platform for being viewed by other users.

In step 403, when a user requests to query the shared information, the user sends a query request to the querying server.

In step 404, the querying server receives the query request sent by the user, and searches for shared information meeting a query condition among the shared information released by trusted users according to the query condition in the query request.

In step 405, it is judged whether the number of the shared information searched out meeting the query condition is less than a predetermined number, if it is judged that the number of the shared information searched out meeting the query condition is less than the predetermined number, then step 406 is performed, otherwise step 407 is performed.

In step 406, the shared information meeting the query condition is searched for among shared information released by non-trusted users according to the query condition in the query request, and then step 407 is performed.

The query condition in the query request may be a type of the shared information, the position information, and an identifier of a trusted user or any combination of the three parties. Specific query ways may use existing related methods, which do not be repeated here.

Preferably, when the position information is included in the query condition, the shared information meeting the query condition including the position information is the shared information within a predetermined scope centered at this position information, so that more choices are provided for the user. For example, when the predetermined scope is 100 meters, the shared information meeting the query condition including the position information is the shared information within the scope of 100 meters centered at this queried position information.

In step 407, the querying server returns a query result to the user requesting for query.

By now, the flow shown in FIG. 4 is finished.

It can be seen from the above technical scheme that, in the present invention, shared information released by a user is received and saved; when a query request sent by the user is received, trusted users corresponding to this user are searched out firstly; and then the shared information meeting the query condition is searched for among the shared information released by the trusted users according to the query condition in the query request, and a query result is returned to the user requesting for query. A queried object is processed during a querying process in the technical scheme of the present invention, so that a relatively credible query result may be provided to the querying user through this technical scheme.

The above are just preferable examples of the present invention, and are not used for limiting the present invention. Any modifications, equivalents, improvements, etc., made under the spirit and principle of the present invention, are all included in the protection scope of the present invention.

The invention claimed is:

1. A method for information query, comprising:
receiving and saving pieces of shared information released by users of a social networking service (SNS);
searching a concern management server maintaining records of one or more user-concern pairs for a target user paired with a concern that matches content of one of the pieces of shared information, and pushing the one of the pieces of shared information to a terminal device the target user;
receiving a query request sent by a querying user among the users of the SNS, and searching among the users of the SNS for trusted users of the querying user, wherein the trusted users of the querying user are tracked in a trust relationship server and are in a good friends chain of or belong to a same group with the querying user in the SNS;
identifying a subset shared information released by the trusted users of the querying user among the pieces of shared information;
searching for all matching shared information meeting a query condition in the query request among the subset shared information to obtain a set of matching shared information;
determining whether a number of pieces of shared information among the set of matching shared information is less than, equal to, or more than a predetermined number;
when it is determined that the number of pieces of shared information is equal to or more than the predetermined number, returning all pieces of the set of matching shared information as a query result to the querying user; and otherwise,
when it is determined that the number of pieces of shared information is less than the predetermined number, searching for additional matching shared information meeting the query condition and released by at least one non-trusted user according to the query condition in the query request, and returning the additional matching shared information released by the at least one non-trusted user together with the set of matching shared information released by the trusted users as the query result to the querying user, wherein the at least one non-trusted user is not in the good friends chain of or does not belong to the same group with the querying user in the SNS and wherein whether a piece of shared information is from a trusted user or non-trusted user is marked in the query result.

2. The method according to claim 1, wherein saving pieces of shared information released by users of the SNS further comprises:
when saving the pieces of shared information released by the users, saving position information corresponding to the pieces of shared information correspondingly, and
wherein the query result further carries position information corresponding to each piece of shared information contained in the query result;
wherein the query condition comprises at least one of a type of shared information, a queried position, and identifiers of the trusted users; and
wherein when the query condition comprises the queried position, the query result contains shared information having corresponding position information within a predetermined range centered at the queried position.

3. The method according to claim 1, further comprising:
after the querying user receives the query result, determines that a piece of shared information in the query result is accurate, receiving an accuracy indication that the piece of shared information is accurate from the querying user and mark the piece of shared information as considered accurate by the querying user.

4. The method according to claim 3, further comprising:
when the piece of shared information corresponding the accuracy indication is included in another query result, including the accuracy indication in the other query result.

5. A system for information query, comprising:
a processing server device including a processor coupled to a memory storing instructions for execution by the processor, to receive and save pieces of shared information released by users of a social networking service (SNS);
a concern management server configured to maintain records of one or more user-concern pairs and to search for a target user paired with a concern that matches content of one of the pieces of shared information, and to push the one of the pieces of shared information to a terminal device of the target user; and a querying server device including a processor coupled to a memory storing instructions for execution by the processor, to
receive a query request sent by a querying user among the users of the SNS via a querying terminal device;
search among the users of the SNS for trusted users of the querying user, wherein the trusted users of the querying user are tracked in a trust relationship server and are in a good friends chain of the querying user in the SNS;
identify a subset shared information released by the trusted users of the querying user among the pieces of shared information;
search for all matching shared information meeting a query condition in the query request among the subset shared information to obtain a set of matching shared information;
determine whether a number of pieces of shared information among the set of matching shared information is less than, equal to, or more than a predetermined number;
when it is determined that the number of pieces of shared information is equal to or more than the predetermined number, return all pieces of the set of matching shared information as a query result to the querying user; and otherwise,
when it is determined that the number of pieces of shared information is less than the predetermined number, search for additional matching shared information meeting the query condition and released by at least one non-trusted user according to the query condition in the query request, and return the additional matching shared information released by the at least one non-trusted user together with the set of matching shared information released by the trusted users as the query result to the querying user, wherein the at least one non-trusted user are not in a good-friends chain of the querying user in the SNS and wherein whether a piece of shared information is from a trusted user or non-trusted user is marked in the query result.

6. The system according to claim 5, wherein the processing server device is to save position information corresponding to each piece of shared information when to save pieces of shared information released by the users of the SNS;
wherein the query result further carries the position information corresponding to each piece of shared information searched out contained in the query result; and
wherein the querying terminal device of the querying user is to call a map in the querying terminal device upon receiving the query result returned to the querying user, and display pieces of shared information contained in the query result on the map according to the position information corresponding to the pieces of displayed shared information in the query result.

7. The system according to claim 6, wherein
when the querying user selects a piece of the displayed pieces of shared information, the querying terminal device is to obtain a current location of the querying user, and provide a route on the map along which the user is to reach a position corresponding to the selected piece of shared information from the current location.

8. The system according to claim 5, wherein:
the processing server device is to save position information corresponding to each piece of shared information when to save pieces of shared information released by the users of the SNS; the query result further carries the position information corresponding to each piece of shared information searched out contained in the query result;
the query condition comprises at least one of a type of shared information, a queried position, and identifiers of the trusted users; and
when the query condition comprises the queried position, the query result contains shared information having corresponding position information within a predetermined range centered at the queried position.

9. A method for information query, comprising:
receiving and saving pieces of shared information released by users of a social networking service (SNS);
receiving and saving position information corresponding to the pieces of information;
receiving a query request sent by a querying user among the users of the SNS, and searching among the users of the SNS for trusted users of the querying user, wherein the trusted users of the querying user are tracked in a trust relationship server and are in a good friends chain of or belong to a same group with the querying user in the SNS; identifying a subset shared information released by the trusted users of the querying user among the pieces of shared information;
searching for all matching shared information meeting a query condition in the query request among the subset shared information to obtain a set of matching shared information;
determining whether a number of pieces of shared information among the set of matching shared information is less than, equal to, or more than a predetermined number;
when it is determined that the number of pieces of shared information is equal to or more than the predetermined number, returning all pieces of the set of matching shared information as a query result to the querying user; and otherwise;
when it is determined that the number of pieces of shared information is less than the predetermined number, searching for additional matching shared information meeting the query condition and released by at least one non-trusted user according to the query condition in the query request, and returning the additional matching shared information released by the at least one non-trusted user together with the set of matching shared information released by the trusted users as the query result to the querying user, wherein the at least one non-trusted user is not in the good friends chain of or does not belong to the same group with the querying user in the SNS and wherein whether a piece of shared information is from a trusted user or non-trusted user is marked in the query result,
wherein the query result further carries position information corresponding to each piece of shared information contained in the query result;
wherein the query condition comprises at least one of a type of shared information, a queried position, and identifiers of the trusted users; and
wherein when the query condition comprises the queried position, the query result contains shared information having corresponding position information within a predetermined range centered at the queried position.

* * * * *